Dec. 10, 1957 L. P. BROOKS Re. 24,399

FIREPLACE FLAME SIMULATING DEVICE

Original Filed June 14, 1952 2 Sheets-Sheet 1

INVENTOR.

Lorimer P. Brooks

FIREPLACE FLAME SIMULATING DEVICE

Original Filed June 14, 1952 2 Sheets-Sheet 2

INVENTOR.

Lorimer P. Brooks

United States Patent Office

Re. 24,399
Reissued Dec. 10, 1957

24,399

FIREPLACE FLAME SIMULATING DEVICE

Lorimer P. Brooks, Tuckahoe, N. Y., assignor to Drum Fire, Inc., Tuckahoe, N. Y., a corporation of New York Original No. 2,684,244, dated July 20, 1954, Serial No. 293,696, June 14, 1952. Application for reissue July 20, 1955, Serial No. 523,401

9 Claims. (Cl. 40—126)

Matter enclosed in heavy brackets [ ] appears in the original patent but forms no part of this reissue specification; matter printed in italics indicates the additions made by reissue.

The present invention relates to a fireplace device and more particularly to a device which realistically simulates a fire of wood or other combustible matter.

Various attempts have been made in the past to simulate fires of wood, etc., so as to provide a device which may be placed in fireplaces and other other places to provide a pleasing effect without actually creating flames or causing combustion. Such devices are useful not only in artificial fireplaces or in other places where real flames are unsuitable but also in real fireplaces where it is desired to avoid the trouble, dirt, sparks, etc., of a real fire. The devices thus far produced by others have never closely approached the appearance of flames of combustion.

In accordance with my invention I provide a device which may be placed adjacent a log member comprising a single log or a stack of logs or pieces of wood, either real or simulated, or adjacent other members which it is desired to associate with a moving or dancing flame, and a very realistic appearance is provided. The device comprises a movable, mirror-like, reflecting surface which is provided with a plurality of randomly spaced and shaped indentations and means for moving the surface at a rate such that the individual indentations are not visible to the eye and the desired flame effect is obtained. In the preferred form of the invention the highly reflecting surface has approximately the shape of a cylindrical drum and the indentations have spacings and depths within particular ranges. The drum is rotated by a motor at a predetermined speed, and a pair of colored light sources, the preferred color being orange, associated with a reflector, direct light on the drum in a predetermined direction. The drum is rotated in a direction such that, when viewed by an observer, the surface of the drum moves upwardly.

Accordingly, it is an object of my invention to provide a moving flame simulator which provides a realistic appearance and which is simple and economical to manufacture.

Other objects and advantages of my inventon will be apparent from the following detailed description of a preferred embodiment of the invention which should be considered in connection with the accompanying drawings, in which.

Figure 1:
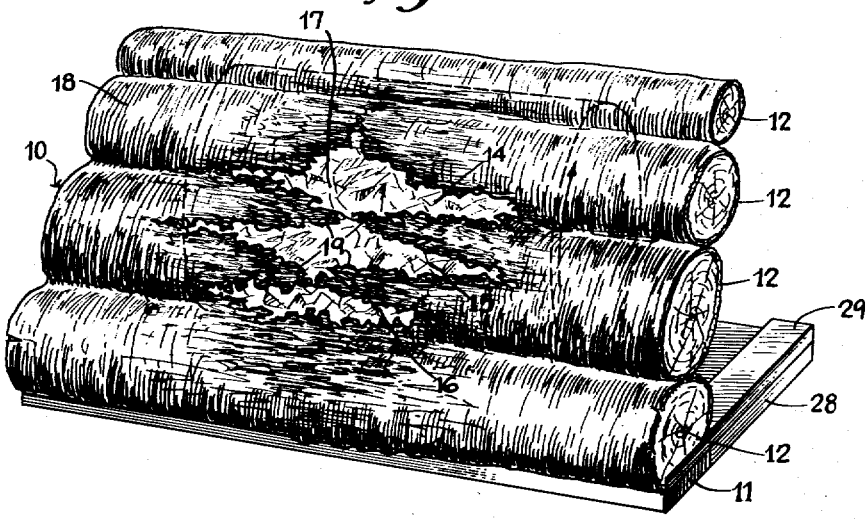
Fig. 1 is a perspective view of the fireplace device of my invention including a log member and a flame simulator.

Referring to the drawings, which show the flame-simulating device of my invention in conjunction with a log member comprising a plurality of logs arranged in a stack, the log member 10 is mounted on the base 11 and comprises a plurality of end pieces 12 which are fastened to each other by any suitable means such as nails. Secured to the front of the end piece 12 is a foraminous sheet 13, which may be wire lath or wire screening material, which forms a base for a formable material which subsequently hardens, such as plaster, magnesite, etc. The sheet 13 is cut away at the portions 14, 15 and 16 so as to provide an aperture through which a drum 17 of the flame simulator may be observed. The layer 18 of formable material is applied over the front of the sheet 13 and is formed to simulate the shape of logs or sections of wood, and it may be colored to have the appearance of birch wood, oak wood, etc. The inwardly-extending portions 19 and the portions of the face of the log member immediately adjacent the apertures 14, 15 and 16 may be colored black so as to simulate charred wood.

It is to be understood that although the construction shown in the drawings has been found to give the most pleasing effect, the invention is not limited to log members constructed in the manner and having the shape indicated above, but instead the log member may be constructed in other shapes and may be made solely of pieces of wood or from other materials, such as papier mache.

The drum 17 may be constructed by mounting a sheet 20 of reflecting material having a mirror-like surface, such as polished aluminum foil or polished stainless steel, on a pair of disks 21 and 22. The disks 21 and 22 are in turn mounted on a shaft 23 which is supported at its ends by bearings mounted on brackets 24 and 25. The disks preferably are secured to the shaft 23 so as to be rotated therewith and the disks 21 and 22 and the shaft 23 are driven as a unit by a motor 26 connected to the disk 21 or to the shaft 23 by any suitable driving means 27, which may be a gear drive or a friction drive of the type employed to drive phonograph turntables. The motor 26 drives the drum 17 in the direction indicated by the arrow in Fig. 1 and, hence, the surface of the drum 17 moves upwardly as viewed through the apertures 14, 15 and 16.

The brackets 24 and 25 are mounted on a base 28 and the bases 11 and 28 are held together by means of strips 29 and 30. The divided base construction is employed because it simplifies the manufacture of the complete log member and flame simulator assembly, but it will be apparent that a single base for both components may be employed.

The front of the drum 17, namely, that portion of the drum which is visible through the apertures 14—16 is illuminated by a pair of light sources 31 and 32 held in suitable sockets 33 and 34 mounted on brackets 35 and 36 secured to the base 28. The sources 31 and 32 may be conventional incandescent lamps having colored glass bulbs and the light from the sources 31 and 32 is directed onto the front side of the drum 17 by a reflector 37 mounted on the sides of the sources 31 and 32 opposite from the drum 17. It has been found that the color which gives the most pleasing and realistic effect is an orange color, but light sources of different color may also be employed. For example, pleasing results may be obtained with yellow or red bulbs or with combinations of orange, red and yellow bulbs. Of course, if it is desired to produce novel effects rather than the colors of a real flame, bulbs of other colors may also be employed. It will be noted that the light sources 31 and 32 are spaced apart in the direction of the longitudinal axis of the drum 17 and they are mounted below the axis of the drum 17 so as to illuminate the surface of the drum 17 which is visible through the apertures 14, 15 and 16 in the log member 10. It has been found that this position of the light sources 31 and 32 is most satisfactory in that it provides lighting giving the most realistic effect.

Figure 2:
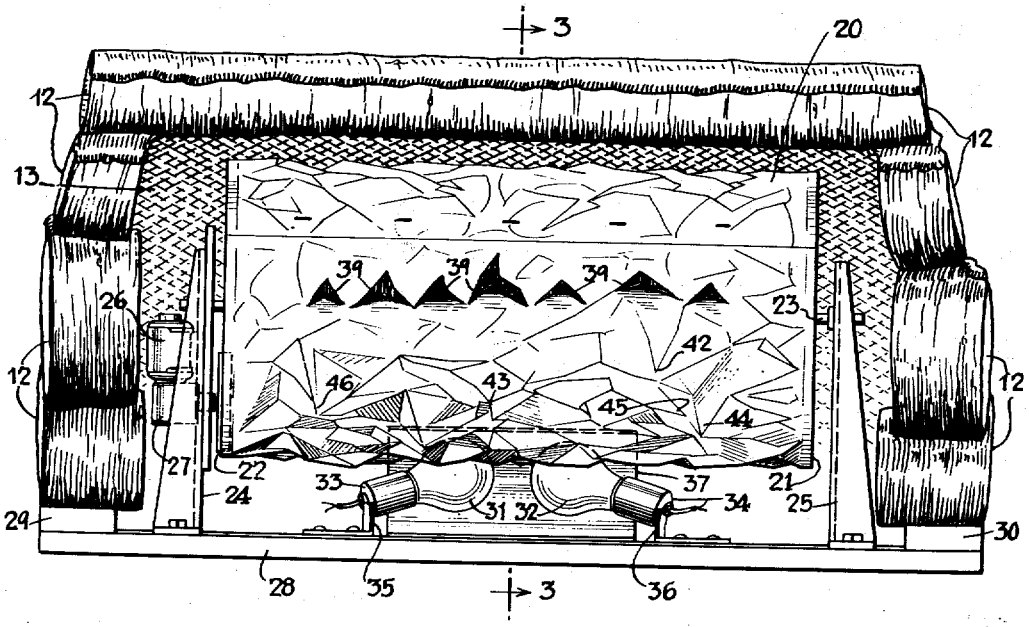
Fig. 2 is a rear elevation view of the embodiment shown in Fig. 1.

The shaping of the surface of the drum 17 is an important factor in producing the appearance of flames of combustion. For example, it has been found that the surface should be provided with a plurality of indentations throughout the portion thereof which is visible through the apertures 14, 15 and 16 so that this portion of the surface comprises a plurality of randomly oriented, reflecting areas. The indentations should have a substantial depth as well as spacings within predetermined ranges and particular configurations. Thus, it has been found that if the spacing and configuration of wrinkles on the surface of the drum is varied without producing indentations of at least one-quarter of an inch in depth with respect to the surface of a cylinder having a radius substantially equal to the maximum radius of the portion of the drum surface visible through the apertures 14, 15 and 16, realistic flames are not produced although the light from the sources 31 and 32 reflected by the surface of the drum 17 is broken up. Also, if the indentations are at least ¼-inch deep but the spacing between the indentations in the direction of the axis of the drum is too great or if indentations whose bottoms extend only parallel to the axis of the drum are provided, realistic flames again are not produced. It has been found that preferably there should be a plurality of indentations having an average spacing in the direction of the axis of the drum and between corresponding points on the indentations, such as the valleys thereof, between 0.8 and 1.25 inches but the spacing may range from approximately 0.5 to 2.0 inches. If the spacing between the indentations is made too small, i. e., substantially below 0.5 inch, then realistic flames are again not produced because the surface is broken up into areas which are too small in size to give the desired impression. Preferably, the indentations are from ¼ to 1½ inches in depth, 1 to 2 inches in width and length, but the indentations may be deeper and longer, the length dimension being in the direction of rotation of the drum 17. Also, preferably the walls of the indentations are substantially smooth, and a plurality of the indentations have ends facing substantially in the direction of rotation which when viewed through the apertures 14—16 have the shape of an inverted V, examples of such ends being designated by the numerals 42—46 in Fig. 2.

The production of moving flames depends upon the fact that when an illuminated surface is moved at a slow enough speed, the eye not only sees individual areas of the surface but also light changes and portions of the light source and, when the surface is moved at a high speed, the eye sees only a substantially steady light pattern, but when the surface is moved at speeds between these two extremes, the eye does not see individual areas but does see moving light patterns. The indentations break the surface of the drum up into small areas of irregular configuration and at any given position and instant the light reflected from the surface of the drum is broken up into patches of light of irregular configuration and varying intensity. As the drum is rotated, the light pattern from the surface of the drum varies and as the drum moves the patches of light not only appear to move in the direction in which the drum is moving but also their configuration changes. If the drum is rotated very slowly, the individual reflecting areas on the surface of the drum may be observed and, in fact, if the drum is rotated sufficiently slowly, portions of the light sources themselves may be recognized. However, as the speed of rotation of the drum is increased, the light sources become indistinguishable and the eye sees only moving patches of light of irregular and changing configuration. If the speed of the drum is increased to a very high rate, then the motion of the patches is substantially lost due to persistence of vision. It has been found that when the diameter of the drum is approximately 8 inches and the surface of the drum has the configuration heretofore described, the speed of rotation of the drum should be between 35 and 200 revolutions per minute and preferably the speed of rotation should be between 60 and 90 revolutions per minute. Also, it has been found that for a given effect drums of larger diameter should be rotated faster than drums of smaller diameter.

Thus, it will be seen from the above that the configuration of the flames is controlled by the indentations on the surface of the drum 17 and the dancing effect is in part determined by the configuration of the indentations and in part by the speed of rotation of the drum 17. Accordingly, when a surface is prepared, the indentations are made in the size required to produce the desired flame configurations and the drum speed is adjusted to produce the desired motion of the flames. If a slow, "lazy" fire is desired, the drum should be rotated at a relatively slow speed within the broad range indicated above and, if a brisk, roaring fire is desired, the drum 17 should be rotated at a relatively high speed within the above-mentioned broad range.

Figure 3:
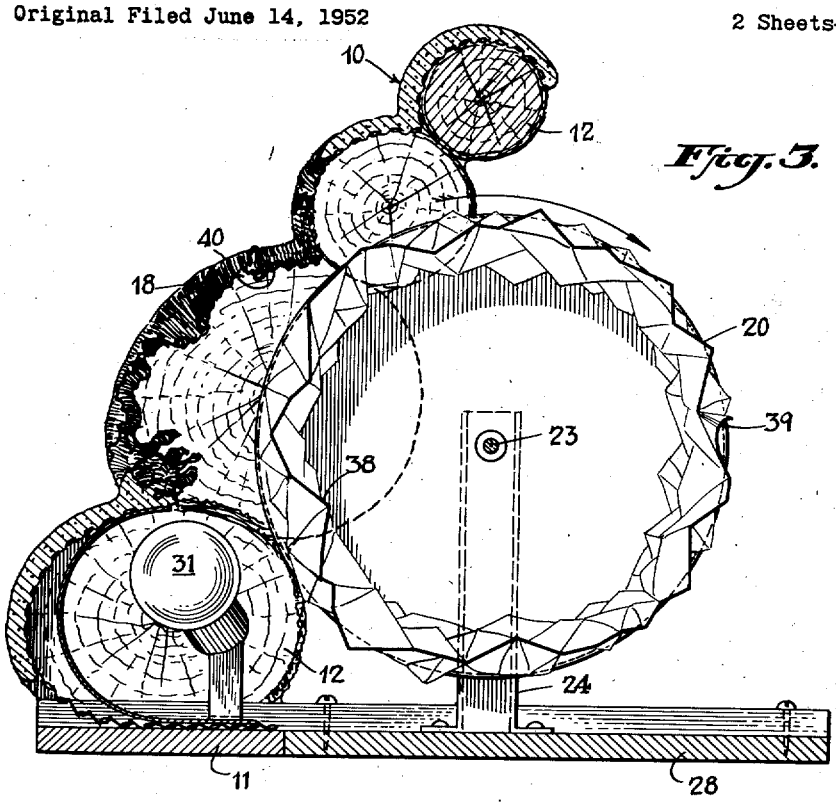
Fig. 3 is a side elevation, cross-sectional view of the embodiment shown in Figs. 1 and 2 and is taken along the lines 3—3 indicated in Fig. 2.
Figure 4:
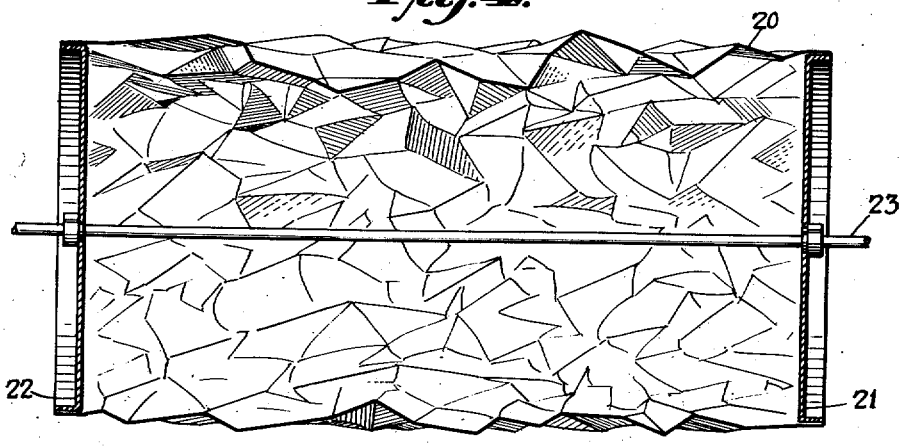
Fig. 4 is a cross-sectional view of the drum shown in Figs. 1–3 and forming part of the flame simulator.

Normally, the simulated flames appear on the portion of the drum 17 between the upper of the projecting portions 19 and the lower edge of the aperture 16, and, roughly speaking, the average height of the simulated flames is two-thirds of the diameter of the drum 17. However, the configuration of the drum may also be altered to produce leaping flame and sparking effects. The leaping flame effect may be produced by either of two methods. In the first method, a relatively large indentation, such as the indentation 38 shown in Fig. 3, whose bottom extends in the direction parallel to the axis of the drum is made in the surface of the drum. Such an indentation may, for example, be two inches deep and four to five inches long if the drum diameter is eight inches and the drum length is approximately 12 inches. Light in an irregular strip is reflected from the upper wall of the indentation 38 after this wall has passed the upper ones of the projecting portions 19 and this produces the appearance of a leaping flame.

In the other method of producing a leaping flame, the drum is provided with flaps 39 (Figs. 2 and 3) which have reflecting undersides, i. e., the sides nearest the axis of the drum 17. With a flap such as a flap 39 light is reflected from the underside of the flap toward an observer and downwardly on the surface of the drum under the flap 39 when the flap is in a position near the upper edge of the aperture 14. The flaps 39 have irregular configurations and, thus, each time they appear near the upper portion of the aperture 14 they provide the appearance of a narrow strip of flames moving upwardly and spaced from the bulk of the flames appearing in the apertures 15 and 16. If desired, the portion of the surface of the drum 17 under the flaps 39 may be omitted because the undersides of the flaps are sufficient to provide the leaping flame effect.

The sparking effect may be provided by producing a few relatively long and narrow indentations around the periphery of the drum 17. The length dimension of these indentations extends in the direction of rotation of the drum 17 and the indentations may be ½ to 2 inches long and only 1/16 to ⅛ of an inch wide. These indentations are not sufficiently wide to produce the appearance of flames, but do produce the appearance of sparks rising from the flames.

It has also been found that there is sufficient light reflected from the rear surface 40 of the log member 10 to produce a faint glow on the portion of the drum surface appearing through the aperture 14 above the simulated flames and the color of the glow may be controlled by varying the color of the inner surface 40 of the log member 10. Therefore, it is possible to produce the appearance of smoke rising from the flames by suitably coloring the inner face 40 of the log member 10. For example, if the inner face 40 is colored white or grey, the surface of the drum 17 appearing through the upper portion of the aperture 14 presents the appearance of thin clouds of smoke rising upwardly.

It will be seen from an understanding of the invention that the flame-simulating surface need not take the shape of a drum but may have other shapes which permit the surface to have the afore-mentioned indentations and to be moved past the apertures 14, 15 and 16 in the log member 10. The drum shape is preferred because of the ease with which it may be constructed and associated with stacked logs and because it provides simulated flame movement in an upward direction. Also, it will be understood that the flame-simulating portion of the apparatus is not restricted to use with log members but, instead, may be employed with other devices or members with which it is desired to associate simulated flames.

In addition, materials other than sheet metal may be employed to form the reflecting surface, i. e., the surface may be formed from paper coated with silver and, although silver-colored reflecting surfaces are preferred, the surface may be colored with other colors such as red, yellow, etc., reflecting sheets of these latter colors being commercially available.

While the invention has been described with reference to the preferred forms thereof, it will be understood by those skilled in the art, after understanding the invention, that modifications and changes may be made therein without departing from the spirit and scope of the invention as defined by the claims appended hereto.

What is claimed as new and what I desire to secure by Letters Patent of the United States is:

1. A fireplace device comprising a first member having the appearance of combustible material having an aperture therein, a *rotatable* [second] member [of generally cylindrical shape] having a movable, mirror-like reflecting surface *spaced from its axis of rotation, said rotatable member being* mounted behind said first member with a portion of said surface directly visible through said aperture, said portion comprising a plurality of randomly oriented, contiguous and mirror-like reflecting areas of random configuration, means for rotating said *rotatable* [second] member at a speed such that the individual reflecting areas are indistinguishable by the eye and for thereby moving said surface past said aperture at a predetermined speed, and means for projecting light of a predetermined color on said portion.

2. A fireplace device comprising a first member simulating combustible material and having a light transparent aperture therein, a second member of generally cylindrical shape having a movable, peripherally extending mirror-like reflecting surface mounted behind said first member with a portion of said surface directly visible through said aperture, said surface being formed by a plurality of randomly oriented, contiguous and mirror-like reflecting portions of random configuration, means for rotating said second member at a speed such that the individual reflecting areas are indistinguishable by the eye and for thereby moving said surface past said aperture at a predetermined speed, and means for projecting light of a predetermined color on said portion.

3. A fireplace device comprising a log member having an aperture therein, a further member of generally cylindrical shape having a movable, mirror-like, reflecting surface mounted behind said log member with a portion of said surface directly visible through said aperture, said portion comprising a plurality of randomly oriented, contiguous and mirror-like reflecting areas of random configuration, means for rotating said further member at a speed such that the individual reflecting areas are indistinguishable by the eye and for thereby moving said surface past said aperture at a predetermined speed, and means for projecting light of a predetermined color on said portion.

4. A fireplace device comprising a member having the appearance of combustible material and having at least one unobstructed aperture therein, a rotatable drum having a mirror-like reflecting surface mounted behind said member with a portion of said surface directly visible through said aperture as said drum is rotated, said drum having its axis extending substantially horizontally and in a direction substantially parallel with a plane containing said aperture and said portion of said surface having a plurality of randomly spaced indentations therein which thereby provide a plurality of randomly oriented, contiguous and mirror-like reflecting areas on said surface, means for rotating said drum at a speed such that the individual reflecting areas are indistinguishable by the eye and a light source mounted between said member and said drum.

5. A fireplace device comprising a plurality of logs mounted in a stack, said stack having at least one unobstructed aperture therein, a rotatable drum having a mirror-like reflecting surface mounted behind said stack with a portion of said surface directly visible through said aperture as said drum is rotated, said drum having its axis extending substantially horizontally and in a direction substantially parallel with a plane containing said aperture and said portion of said surface having a plurality of randomly spaced indentations therein which thereby provide a plurality of randomly oriented, contiguous and mirror-like reflecting areas on said surface, motor means for rotating said drum at a speed such that the individual reflecting areas are indistinguishable by the eye and with the surface traveling upwardly as viewed through said aperture and a light source mounted between said stack and said drum.

6. A fireplace device comprising a plurality of logs mounted in a stack, said stack having at least one light transparent aperture therein, a rotatable drum having a mirror-like, reflecting surface mounted behind said stack with a portion of said surface directly visible through said aperture as said drum is rotated, said drum having its axis extending substantially horizontally and in a direction substantially parallel with a plane containing said aperture and said portion of said surface having a plurality of randomly spaced indentations therein which thereby provide a plurality of randomly oriented, contiguous and mirror-like reflecting areas on said surface, said indentations being distributed throughout said portion and having substantial depths and a plurality of said indentations having ends facing substantially in the direction of rotation of said drum which have substantially the shape of an inverted V, the walls of said indentations being substantially smooth and mirror-like, motor means for rotating said drum at a speed such that the individual indentations are indistinguishable by the eye with the surface traveling upwardly as viewed through said aperture and a light source having the color of flames, said source being mounted between said stack and said drum.

7. A fireplace device comprising a plurality of logs mounted in a stack, said stack having at least one light transparent aperture therein, an approximately cylindrical and rotatable drum having a mirror-like, reflecting surface mounted behind said stack with a portion of said surface directly visible through said aperture as said drum is rotated, said drum having its axis extending horizontally and in a direction substantially parallel with a plane containing said aperture and said portion of said surface having a plurality of randomly spaced indentations therein which thereby provide a plurality of randomly oriented, contiguous and mirror-like reflecting areas on said surface, said indentations being distributed throughout said portion and having an average spacing in the direction parallel to said axis from 0.5 to 2.0 inches, said indentations also having depths at least as great as 0.25 inch as measured from the surface of a cylinder having a radius equal to the maximum radius of said portion of said surface and a plurality of said indentations having ends facing substantially in the direction of rotation of said drum which have substantially the shape of an inverted V, the walls of said indentations being substantially smooth and mirror-like, motor means for rotating said drum at a speed in the range from 35 to 200 revolutions per minute with the surface traveling upwardly as viewed through said aperture, and a light source having the color of flames, said source being mounted between said stack and said drum and below the axis of said drum.

8. A fireplace device comprising a plurality of logs mounted in a stack, said stack having at least one unobstructed aperture therein, an approximately cylindrical and rotatable drum having a mirror-like, reflecting surface mounted behind said stack with a portion of said surface directly visible through said aperture as said drum is rotated, said drum having its axis extending horizontally and in a direction substantially parallel with a plane containing said aperture and said portion of said surface having a plurality of randomly spaced indentations therein which thereby provide a plurality of randomly oriented, contiguous and mirror-like reflecting areas on said surface, said indentations being distributed throughout said portion and having an average spacing in the direction parallel to said axis from 0.8 to 1.25 inches, said indentations also having depths from 0.25 to 1.5 inches as measured from the surface of a cylinder having a radius equal to the maximum radius of said portion of said surface and a plurality of said indentations having ends facing substantially in the direction of rotation of said drum which have substantially the shape of an inverted V, the walls of said indentations being substantially smooth and mirror-like, motor means for rotating said drum at a speed in the range from 60 to 90 revolutions per minute with the surface traveling upwardly as viewed through said aperture, a light source having the color of flames, said source being mounted between said stack and said drum and below the axis of said drum, and reflector means mounted adjacent said source on the side thereof opposite from said drum.

9. A fireplace device comprising a member having the appearance of combustible material and having a light transparent aperture therein, an approximately cylindrical and rotatable drum having a substantially imperforate wall, said wall having a mirror-like, reflecting outer surface and said drum being mounted behind said member with a circumferential portion of said surface directly visible through said aperture as said drum is rotated, said drum having its axis extending substantially horizontally and in a direction substantially parallel with a plane containing said aperture and said portion of said surface having a plurality of randomly spaced indentations therein which thereby provide a plurality of randomly oriented, contiguous and mirror-like reflecting areas on said surface, said indentations being distributed throughout said portion and having an average spacing in the direction parallel to said axis from 0.5 to 2.0 inches, said indentations also having depths from 0.25 to 1.5 inches as measured from the surface of a cylinder having a radius equal to the maximum radius of said portion of said surface of said drum and a plurality of said indentations having ends facing substantially in the direction of rotation of said drum which latter indentations have substantially the shape of an inverted V, the walls of said indentations being substantially smooth and mirror-like, motor means for rotating said drum at a speed in the range from 35 to 200 revolutions per minute with the surface of said drum traveling upwardly as viewed through said aperture, and means for projecting light on said portion visible through said aperture, said means being mounted between said member and said drum.

References Cited in the file of this patent or the original patent

UNITED STATES PATENTS

| | | |
|---|---|---|
| 1,514,552 | McCormick | Nov. 4, 1924 |
| 1,719,622 | Price | July 2, 1929 |
| 1,827,941 | Gross | Oct. 20, 1931 |
| 2,096,884 | Dietlein | Oct. 26, 1937 |

FOREIGN PATENTS

| | | |
|---|---|---|
| 320,224 | Great Britain | 1929 |
| 401,690 | Great Britain | 1933 |
| 410,568 | Great Britain | 1934 |
| 450,941 | Great Britain | 1936 |